Aug. 12, 1958     W. J. RONAN     2,847,177
GRAB BAR MOUNTING MEANS

Filed Oct. 12, 1955     3 Sheets-Sheet 1

INVENTOR.
William J. Ronan
BY Myron J. Dikeman
ATTORNEY

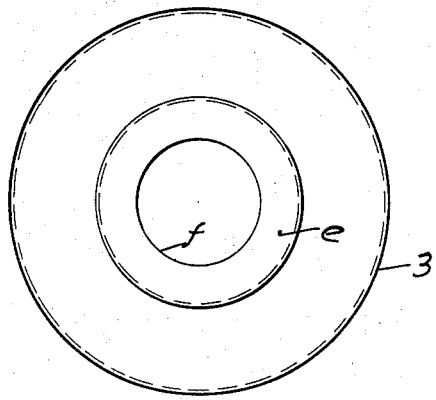
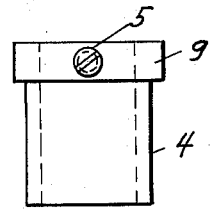
Fig. 4
Fig. 5
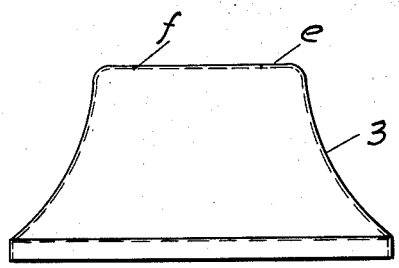
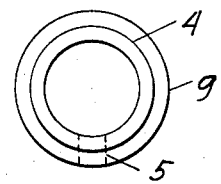
Fig. 3
Fig. 6
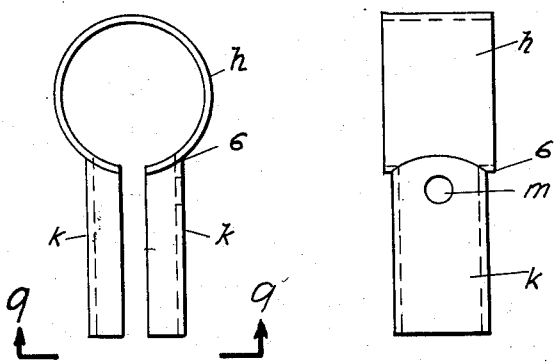
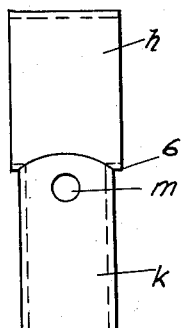
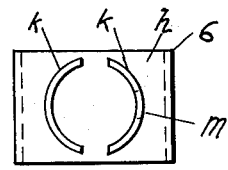
Fig. 7
Fig. 8
Fig. 9
INVENTOR.
William J. Ronan
BY Myron J. Dikeman
ATTORNEY

United States Patent Office 2,847,177
Patented Aug. 12, 1958

2,847,177

GRAB BAR MOUNTING MEANS

William J. Ronan, Detroit, Mich., assignor to Safety Bath Rail, Inc., Dearborn, Mich.

Application October 12, 1955, Serial No. 540,136

2 Claims. (Cl. 248—216)

This invention is an improvement over that shown in my prior patent application Ser. No. 525,298, filed July 29, 1955.

My invention provides an improved grab bar mounting means especially adapted for installation during a bath room wall construction, for rigidly mounting said grab bar.

The improved means is shown in the appended drawings.

In these drawings:

Fig. 3 is an elevation view of a bell housing of such means.

Fig. 4 is a plan view of said bell housing.

Fig. 5 is an elevation view of a flanged sleeve of such means.

Fig. 6 is a bottom plan view of said flanged sleeve.

Fig. 7 is an elevation view of an arcuate strip of such means.

Fig. 8 is a side view of said arcuate strip.

Fig. 9 is a bottom plan view of said arcuate strip taken on line 9—9 of Fig. 7.

Figure 1:
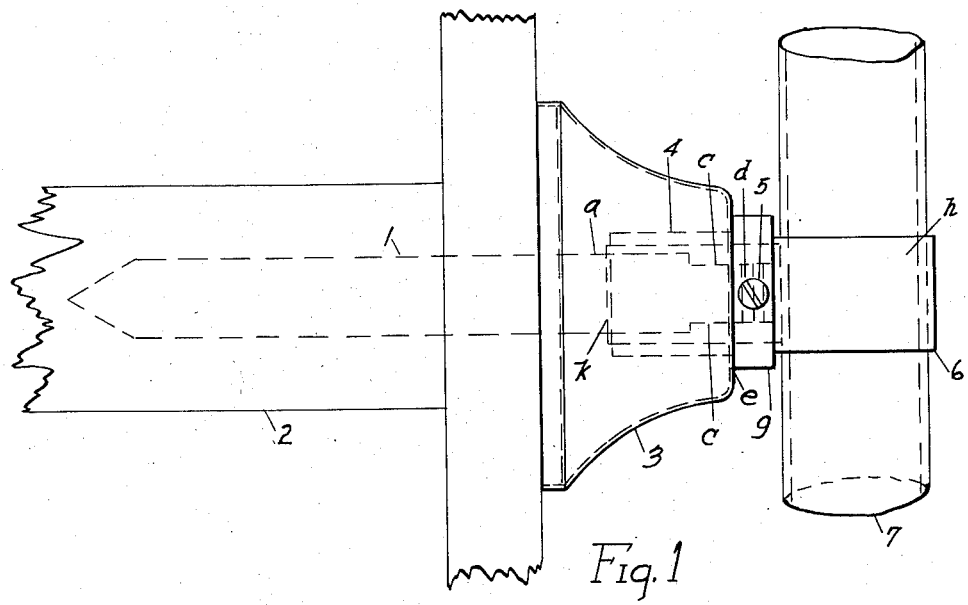
Fig. 1 is a plan view of my improved means.
Figure 2:
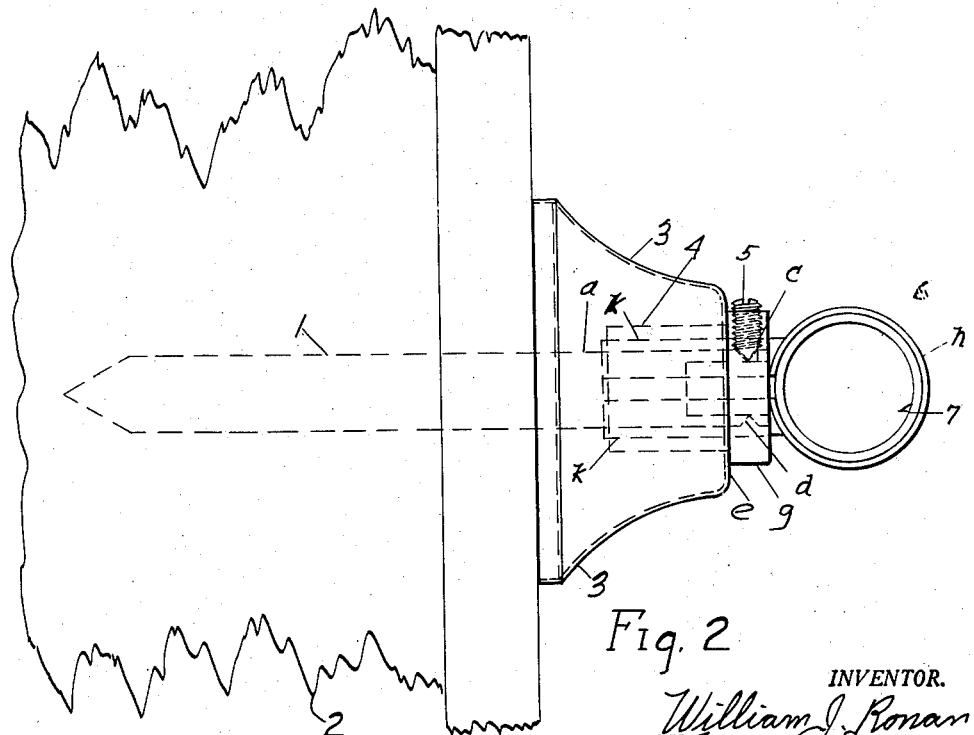
Fig. 2 is an elevation view of such means.
Figure 12:
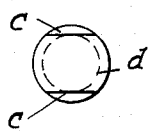
Fig. 12 is a top plan view of said mounting screw.
Figure 10:
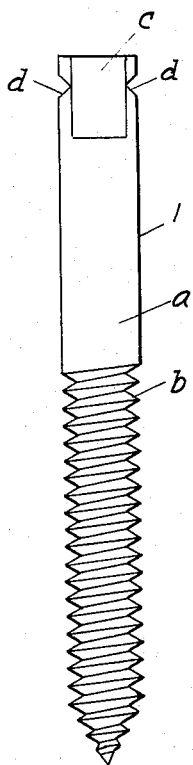
Figs. 10 and 11 are elevation and side views of an elongated mounting screw of such means.
Figure 11:
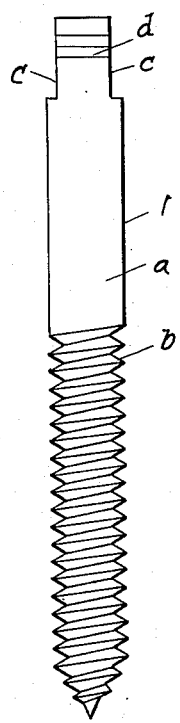

The drawings show an elongated mounting screw 1 having a smooth portion $a$ and a threaded portion $b$, pointed for screwing into a building wall stud 2 during the building construction. The outer end portion $a$ has flat, parallel wrench receiving portions $c$, for receiving a turning wrench for firmly screwing said mounting screw 1 in the wall stud 2, and has peripheral notches $d$ for receiving the pointed end of a set screw 5.

After completion of the building wall surface, with the said mounting screw 1 projected a predetermined length beyond the bath room wall surface, at right angles thereto, a bell housing 3 is mounted concentrically over said mounting screw 1. Housing 3 has a flat circular outer end $e$, formed with a central opening $f$ for receiving a sleeve 4 whose flange $g$ has a tapped hole for receiving the set screw 5.

An arcuate strip 6, formed with an open tubular collar portion $h$ and side portions $k$ is slidably mounted over the mounting screw end $a$, and is positioned within the sleeve 4, and pressed tightly in position. Strip 6 is formed with a hole $m$ in one side $k$ for receiving set screw 5, allowing it to pass through and its end to seat within the mounting screw notch $d$ for locking the assembly together.

Strip 6 is positioned with the tubular collar $h$ horizontal for receiving a grab bar 7, rigidly holding it in a predetermined position.

Having fully described my improved grab bar mounting means, what I claim as my invention is:

1. A mounting means for supporting a tubular grab bar or the like upon a wall in spaced relation therewith, including an elongated screw adapted to be threadably mounted upon said wall to project outwardly therefrom, said screw having opposed flat wrench receiving portions at its outer end and peripheral notches between said portions, a bell housing positioned axially over the outer end of said screw, an outwardly flanged sleeve positioned on the outer end of said screw and having a tubular shank projecting into said housing with its flange bearing against an outer surface of said housing, an arcuate strap adapted to surround said tubular grab bar and terminating in a pair of opposed arcuate ends positioned over the outer end of said screw within said tubular sleeve, and a set screw extending through said flange and an end of said strap and within one of said notches to retain said housing, sleeve and strap in fixed relation relative to said screw.

2. For mounting a grab rail on a wall, means consisting of a screw mounted on and projecting outwardly from said wall, said screw being notched on its side adjacent its outer end, portions of said screw adjacent said notch being flat to permit application of a wrench, a bell housing loosely positioned axially over the outer portions of said screw, a flanged sleeve having a tubular shank projected into said housing with its flange operatively engaging said housing, an arcuate strap supporting a portion of said rail and terminating in a pair of opposed arcuate free ends positioned within said sleeve and housing and engaging with said screw, and a set screw extending transversely through said flange and strap retainingly engaging said screw within said notch.

References Cited in the file of this patent

UNITED STATES PATENTS

| | | |
|---|---|---|
| 1,091,365 | McCain | Mar. 24, 1914 |
| 1,193,931 | Schumann | Aug. 8, 1916 |
| 1,859,614 | Boever | May 24, 1932 |
| 2,560,556 | Creedon | July 17, 1951 |
| 2,641,430 | Secofsky et al. | June 9, 1953 |
| 2,674,922 | Robinson | Apr. 13, 1954 |